United States Patent [19]

Hennessee

[11] 4,062,648
[45] Dec. 13, 1977

[54] PLOTTER WITH ADAPTIVE VELOCITY MEANS FOR IMPROVING PLOTTED LINE QUALITY

[75] Inventor: Larry Wayne Hennessee, San Diego, Calif.

[73] Assignee: Hewlett-Packard Company, Palo Alto, Calif.

[21] Appl. No.: 756,675

[22] Filed: Jan. 4, 1977

[51] Int. Cl.² .................. G06F 15/46; G05B 19/18
[52] U.S. Cl. .................................... 364/105; 346/29; 318/571; 364/300; 364/113; 364/520
[58] Field of Search .................. 318/571; 346/29; 235/151, 151.11; 340/172.5

[56] References Cited

U.S. PATENT DOCUMENTS

| | | | |
|---|---|---|---|
| 3,893,616 | 7/1975 | Trousdale | 235/151 |
| 4,021,650 | 5/1977 | Ruble | 235/151.11 |

Primary Examiner—Eugene G. Botz
Attorney, Agent, or Firm—Robert S. Hulse

[57] ABSTRACT

A plotter system is provided having an adaptive velocity means for improving plotted line quality by selectively varying the velocity of the plot head to produce smooth, substantially continuous motions of the plot head between data points, in accordance with changes in the data input rate or changes in the distance between data points. This reduces the time that the plot head remains stationary during plotting, thereby reducing excess deposits such as ink pools that may be applied to a portion of a surface when the plot head becomes stationary waiting for data. The system includes a motor unit, a plot head with a pen, and an adaptive velocity means comprising a random access memory (RAM) unit for storing data values to be plotted, a processor unit, and a read only memory (ROM) unit having a stored routine. The plot head is driven by the motor unit under control of the processor operating in accordance with the stored routine and control and data values stored in the RAM.

10 Claims, 6 Drawing Figures

PLOTTER WITH ADAPTIVE VELOCITY MEANS FOR IMPROVING PLOTTED LINE QUALITY

CROSS-REFERENCE TO RELATED APPLICATION

This application is related to patent application entitled "OPEN-LOOP ELECTRIC DRIVE WITH CORRECTIVE CONTROLLER," Ser. No. 756,679, filed Jan. 4, 1977 by Marvin LeRoy Patterson, Robert Dale Haselby and Albert Prall Kendig.

BACKGROUND AND SUMMARY OF THE INVENTION

Many plotter systems include buffers to temporarily store input data before plotting the data. Many other systems, without buffers, generally plot the data as it is received. In both types of systems, the plot head and pen are generally made to move directly from data point to data point in somewhat jerky, discrete steps when plotting the data. After a data point is plotted, the plot head remains stationary waiting for a subsequent data point. During this stationary period, a disproportionate amount of ink from the pen usually accumulates on the writing surface under the pen, compared to the amount that accumulates on portions of the surface when the pen is in motion. This disproportionate accumulation of ink causes the trace or line segment being plotted to become nonuniform in appearance. Even in plotter systems that provide for a uniform trace when the pen is in motion (i.e., systems that modulate or vary the pressure of ink to the pen as a function of head velocity), appreciable amounts of stationary periods still produce nonuniformity in the trace at the beginning-and end-points of line segments. What is needed, therefore, is a plotter system that also provides for uniformity of trace at the beginning-and end-points of line segments.

Accordingly, as an illustrated preferred embodiment of the present invention, a plotter system is provided having an adaptive velocity means, motor unit and plot head for improving plotted line quality and providing uniformity of trace by substantially reducing the length of each period that the plot head remains stationary waiting for data. The adaptive velocity means includes a RAM, a ROM with a stored routine, and a processor unit for adapting the head velocity to (i.e., for varying the head velocity with) the input data rate and to the distance between data values, to produce substantially smooth (nonjerky), continuous head motion.

DESCRIPTION OF THE PREFERRED EMBODIMENT

Figure 1:
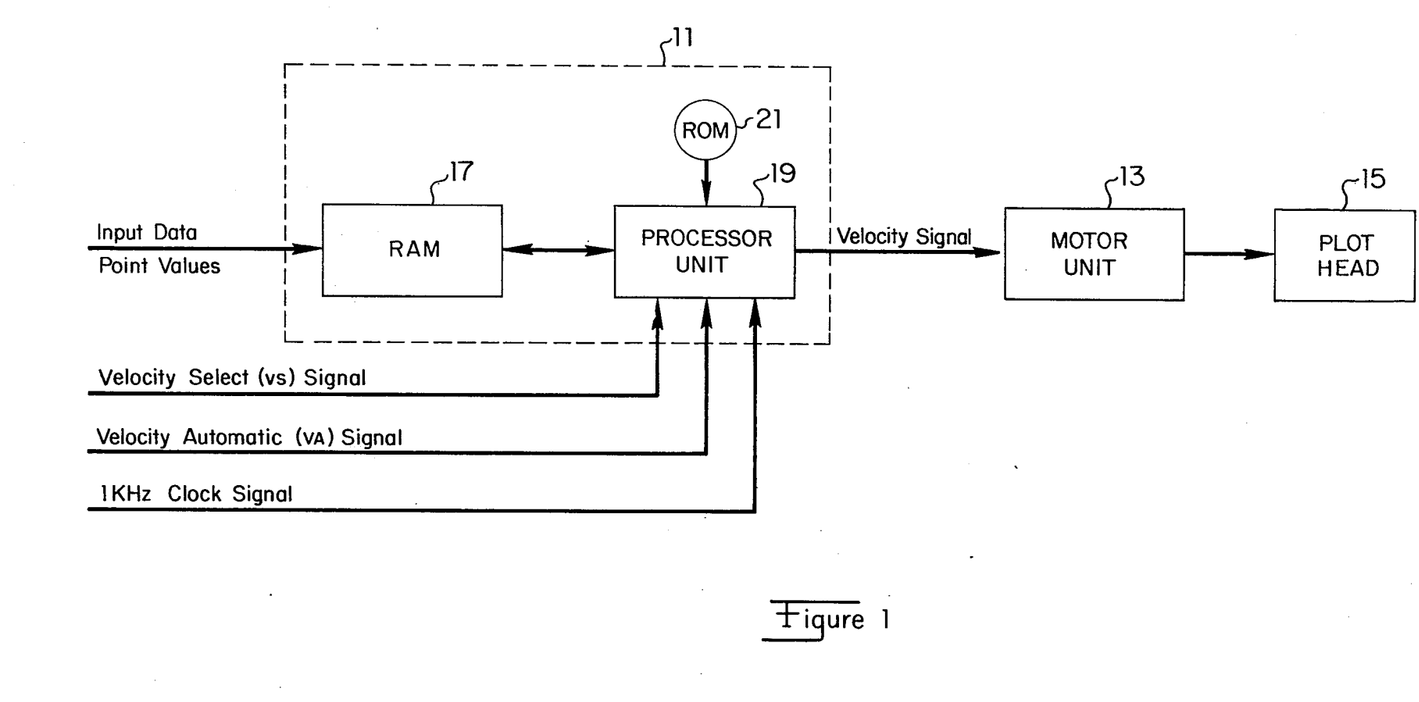
FIG. 1 is a block diagram of a plotter system including an adaptive velocity means in accordance with the preferred embodiment of the present invention.
Figure 2A:
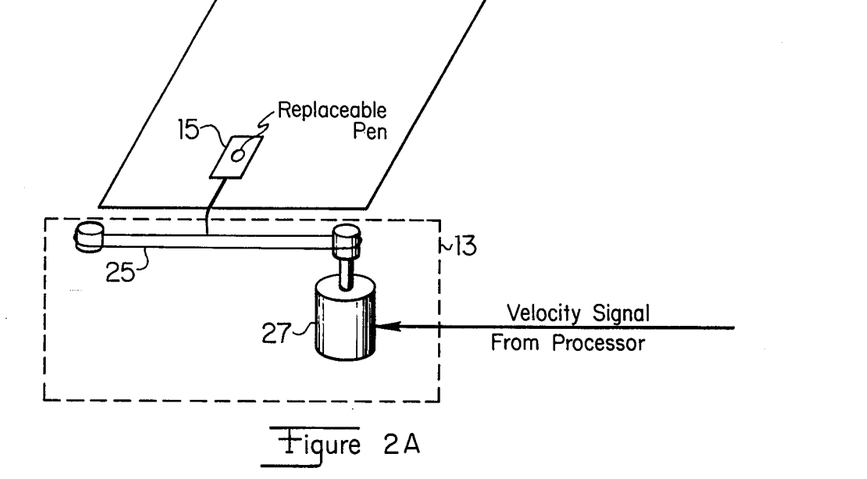
FIGS. 2A and 2B are perspective views of drive mechanisms of the system of FIG. 1.
Figure 2B:
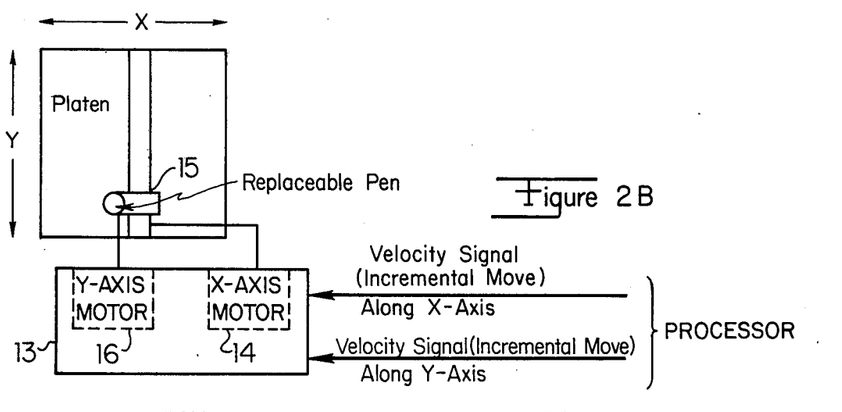
Figure 3:
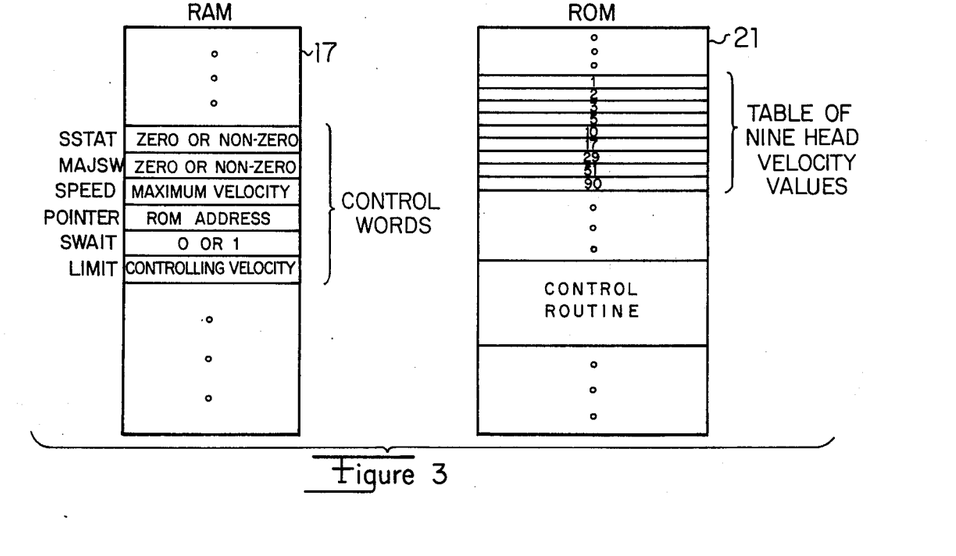
FIG. 3 is a diagrammatic illustration of memory units of the system of FIG. 1.
Figure 4:
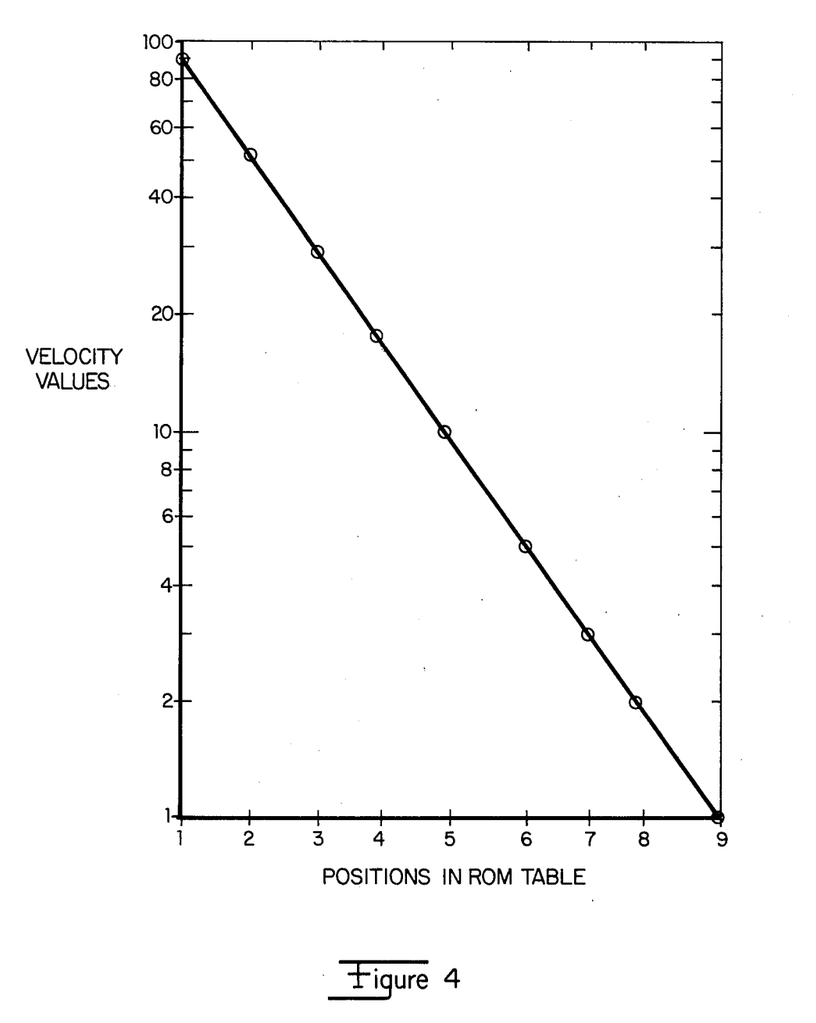
FIG. 4 is a graphic illustration of velocity values stored in one of the memory units of FIG. 3.

FIG. 1 shows a plotter system having an adaptive velocity unit 11, a motor unit 13 and a plot head 15. The adaptive velocity unit 11 includes a read-write or random access memory unit (RAM) 17, processor unit 19, and a read only memeory unit (ROM) 21. Data values to be plotted are received and stored into RAM 17. The processor 19 operates under control of the routine stored in ROM 21 and in accordance with control words stored in RAM 17 to provide a velocity signal (incremental move signal) to motor unit 13. The velocity signal represents the velocity (incremental move per unit time) at which the head 15 is to be moved when the input data values stored in RAM 17 are plotted. The velocity signal causes a motor 27 (FIG. 2A) of motor unit 13 to advance or rotate a selected amount which, in turn, causes plot head 15 to be moved a selected linear distance within a selected unit of time. FIG. 2A shows a drive mechanism 25 connecting motor 27 of motor unit 13 with plot head 15. FIG. 2B shows motor unit 13 having motors 14 and 16 connected to plot head 15 for moving the head in the X-and Y-coordinate directions, respectively. FIG. 3 shows selected control words in RAM 17, a control routine (shown in greater detail in FIG. 5 and in Table 1) and a table of nine velocity values in ROM 21, the nine velocity values chosen, as shown in FIG. 4, to exponentially represent a wide range of velocities of the head 15. Each of the nine velocity values represents a selected distance that plot head 15 is to be moved during a selected period of time. A control word "POINTER" in RAM 17 (FIG. 3) is used to point to or address selected ones of the nine velocity values stored in ROM 21. Initially, the control word POINTER is set to point to the third largest of the nine velocity values in ROM 21.

As shown in FIG. 1, a user of the plotter system may specify an upper velocity limit for the head 15 by entering a VS (velocity select) signal into the system. This upper velocity limit represents the maximum velocity at which the head 15 may be moved. Also, by means of a VA (velocity automatic) signal, the user may specify that velocity is to be automatic, i.e., that the selection of a velocity at which the head 15 is to be moved is to be performed automatically by the system. However, the automatically selected velocity does not exceed the maximum velocity set by the VS signal. For example, in response to an applied VA signal, the system automatically adapts the head velocity to changes in the input data rate or to changes in the distance between successive input data points, or to changes in both the input data rate and distance between successive input data points. Whether a VA signal has been applied to the system is indicated by the contents of the word MAJSW in RAM 17. When the contents of MAJSW is zero ("VA off"), this indicates that no VA signal has been applied to the system; when the contents of MAJSW is not equal to zero ("VA on"), this indicates that a VA signal has been applied to the system. This adaptive or automatic selection of head velocity mentioned above is performed by processor 19 operating in accordance with the control words stored in RAM 17 and under control of the routine stored in ROM 21.

One of these control words is SSTAT. SSTAT is a word in RAM 17 which is preset to a non-zero value when the plotter is busy plotting a data point, and to a zero value when the plotter is not busy.

A list of the instructions of which the routine stored in ROM 21 is comprised is presented in Table 1 following. A logic flow diagram describing the operations of this routine is presented in FIG. 5 and described below.

Table 1

| Sequence No. | ROM Address (Octal) | Object Code (Octal) | Label | Program Instruc'n. | Remarks |
|---|---|---|---|---|---|
| 1925** | | | INSTR TO TURN AUTO PACER ON | | VA |
| 1926 | 44062 | | VA | EQU * | |
| 1927 | 44062 | 040437 | | JSM EOREX | |
| 1928 | 44063 | 267066 | | JMP SETVC | |
| 1930** | | | INSTR TO TURN AUTO PACER OFF | | VN |
| 1931 | 44064 | | VN | EQU * | |
| 1932 | 44064 | 040437 | | JSM EOREX | |
| 1933 | 44065 | 270226 | | LDA 00 | |
| 1934 | 44066 | 031560 | SETVC | STA MAJSW | |
| 1935 | 44067 | 064376 | | JMP IDLOF | |
| 1937** | | | INSTR TO SET PEN VELOCITY | | VS,S(,P) |
| 1939 | 44070 | | VS | EQU * | |
| 1940 | 44070 | 001445 | | LDA EORFG | |
| 1941 | 44071 | 072014 | | RZA FASTS | |
| 1942 | 44072 | 004172 | | LDB 01 | PASSN |
| 1943 | 44073 | 040421 | | JSM ONEST | GET VELOCITY |
| 1944 | 44074 | 174040 | | TCB | |
| 1945 | 44075 | 176027 | | SBP GOER3 | ERROR IF <0 |
| 1946 | 44076 | 024256 | | ADB 044 | |
| 1947 | 44077 | 176425 | | SBM GOER3 | ERROR IF >36 |
| 1948 | 44100 | 030001 | | STA B | CONVERT |
| 1949 | 44101 | 174600 | | SBL 1 | TO |
| 1950 | 44102 | 170400 | | AAR 1 | INTERPOLATOR |
| 1951 | 44103 | 024000 | | ADB A | INTEGER |
| 1952 | 44104 | 067106 | | JMP *+2 | SKIP AROUND |
| 1953 | 44105 | 004202 | FASTS | LDB C132 | FAST DEFAULT !!! |
| 1954 | 44106 | 001445 | | LDA EORFG | PEN SPECIFIED? |
| 1955 | 44107 | 072406 | | SZA PEN# | SKIP IF YES |
| 1956 | 44110 | 035550 | | STB PS1 | NO - |
| 1957 | 44111 | 035551 | | STB PS2 | VELOCITY |
| 1958 | 44112 | 035552 | | STB PS3 | APPLIES |
| 1959 | 44113 | 035553 | | STB PS4 | TO ALL 4 |
| 1960 | 44114 | 054376 | | JMP IDLOF | PENS |
| 1962 | 44115 | 035562 | PEN# | STB PSTMP | SAVE VEL |
| 1963 | 44116 | 004172 | | LDB 01 | GO GET |
| 1964 | 44117 | 040405 | | JSM ONEGT | PEN PARAMETER |
| 1965 | 44120 | 174040 | | TCB | |
| 1966 | 44121 | 176003 | | SBP GOER3 | ERROR IF <1 |
| 1967 | 44122 | 024254 | | ADB 04 | |
| 1968 | 44123 | 176002 | | SBP *+2 | ERROR IF >4 |
| 1969 | 44124 | 054446 | GOER3 | JMP ERR03 | |
| 1970 | 44125 | 020325 | | AOA PSTAD | APPLY VEL |
| 1971 | 44126 | 005562 | | LDB PSTMP | TO SELECTED |
| 1972 | 44127 | 134000 | | STB A,I | PEN |
| 1973 | 44130 | 064373 | GOIDL | JMP IDLE | |
| 2122* | | | | | |
| 2123* | | CALLING SEQUENCE | | JSM MVPEN | |
| 2124* | | FOR PEN ONLY: | | | |
| 2125* | | | | WDPCT <0> (DN) | <1> (UP) |
| 2126* | | | | | |
| 2127 | 44324 | | MVPEN | EQU * | |

| Sequence No. | ROM Address (Octal) | Object Code (Octal) | Label | Program Instruc'n. | Remarks |
|---|---|---|---|---|---|
| 2128 | 44324 | 040516 | | JSM WT4SV | |
| 2129* | | | | | |
| 2130 | 44325 | 031556 | | STA WKPTM | *** |
| 2131 | 44326 | 031512 | | STA LARGE | |
| 2132 | 44327 | 031513 | | STA LARGE+1 | |
| 2133 | 44330 | 004012 | | LDB IB | TEST FOR SOC |
| 2134 | 44331 | 035516 | | STB DEQUE | |
| 2135 | 44332 | 067456 | | JMP DOPEN | |
| 2136* | | | | | |
| 2137* | CALLING SEQUENCE | | | JSM UPSET | |
| 2138* | FOR MOVE: | | | | |
| 2139* | | | | WORDX <X MOVE IN PLOTTER UNITS> | |
| 2140* | | | | WORDY <Y MOVE IN PLOTTER UNITS> | |
| 2141* | | | | WDPCT <0> (DN) <1> (UP) | |
| 2142* | | | | WDMOD <0> (ABS) <1> (REL) | |
| 2143* | | | | | |
| 2144 | 44333 | | UPSET | EQU * | |
| 2145 | 44333 | 001543 | | LDA SSTAT | BUSY? |
| 2146 | 44334 | 072404 | | SZA *+4 | SKIP IF NOT |
| 2147 | 44335 | 000172 | | LDA 01 | |
| 2148 | 44336 | 031561 | | STA SWAIT | OTHERWISE |
| 2149 | 44337 | 067333 | | JMP *-4 | LOOP |
| 2150 | 44340 | 031556 | | STA WKPTM | *** |
| 2151 | 44341 | 031512 | | STA LARGE | |
| 2152* | | | | | |
| 2153 | 44342 | 001506 | | LDA WORDX | GET X |
| 2154 | 44343 | 005511 | | LDB WDMOD | WHICH MODE? |
| 2155 | 44344 | 076004 | | RZB SETX | ABSOLUTE? |
| 2156 | 44345 | 005406 | | LDB XPRES | YES |
| 2157 | 44346 | 174040 | | TCB | CONVERT |
| 2158 | 44347 | 020001 | | ADA B | TO |
| 2159 | 44350 | 031522 | SETX | STA RELX | RELATIVE |
| 2160 | 44351 | 172002 | | SAP *+2 | |
| 2161 | 44352 | 170040 | | TCA | |
| 2162 | 44353 | 031525 | | STA VEL | DX=ABS(DX) |
| 2163* | | | | | |
| 2164 | 44354 | 031507 | | LDA WORDY | GET Y |
| 2165 | 44355 | 005511 | | LDB WDMOD | WHICH MODE? |
| 2166 | 44356 | 076004 | | RZB SETY | ABSOLUTE? |
| 2167 | 44357 | 005407 | | LDB YPRES | YES |
| 2168 | 44360 | 174040 | | TCB | CONVERT |
| 2169 | 44361 | 020001 | | ADA B | TO |
| 2170 | 44362 | 031523 | SETY | STA RELY | RELATIVE |
| 2171 | 44363 | 172002 | | SAP *+2 | |
| 2172 | 44364 | 170040 | | TCA | |
| 2173 | 44365 | 031527 | | STA LVEL | DY=ABS(DY) |
| 2174* | | | | | |
| 2175 | 44366 | 005525 | | LDB VEL | |
| 2176 | 44367 | 170040 | | TCA | |
| 2177 | 44370 | 020001 | | ADA B | ABS(X)-ABS(Y) |
| 2178 | 44371 | 031515 | | STA BIGSW | POS X LARGE : NEG Y LARGE |
| 2179 | 44372 | 172002 | | SAP *+2 | |
| 2180 | 44373 | 005527 | | LDB LVEL | |
| 2181 | 44374 | 035513 | | STB LARGE+1 | |
| 2182* | | | | | |
| 2183 | 44375 | 035676 | | STB DVR | |
| 2184 | 44376 | 005527 | | LDB LVEL | |
| 2185 | 44377 | 015525 | | CPB VEL | |
| 2186 | 44400 | 067411 | | JMP ONE | |
| 2187 | 44401 | 172002 | | SAP *+2 | |
| 2188 | 44402 | 005525 | | LDB VEL | SMALLER INTO B |
| 2189 | 44403 | 000226 | | LDA 00 | |

| Sequence No. | ROM Address (Octal) | Object Code (Octal) | Label | Program Instruc'n. | Remarks |
|---|---|---|---|---|---|
| 2190 | 44404 | 076406 | | SZB ONE+1 | ZERO SLOPE |
| 2191 | 44405 | 040532 | | JSM IDIV | FIND RATIO < 1 |
| 2192 | 44406 | 170400 | | AAR 1 | |
| 2193 | 44407 | 050271 | | AND 07,S | |
| 2194 | 44410 | 067412 | | JMP *+2 | |
| 2195 | 44411 | 000204 | ONE | LDA N1 | SLOPE POSITIVE |
| 2196 | 44412 | 031514 | | STA SLOPE | UNLESS DX = DY |
| 2197* | | | | | |
| 2198* | SET SPEED FOR THIS MOVE | | | | |
| 2199* | | | | | |
| 2200 | 44413 | 001741 | | LDA STABV | STABLE SPEED |
| 2201 | 44414 | 005564 | | LDB PICK | IN A STALL? |
| 2202 | 44415 | 076003 | | RZB *+3 | SKIP IF YES |
| 2203 | 44416 | 001005 | | LDA CVMAX | FIND UR SPEED |
| 2204 | 44417 | 005563 | | LDB FINUR | FINDING UR? |
| 2205 | 44420 | 076035 | | RZB HALAS+1 | SKIP IF YES |
| 2206 | 44421 | 004012 | | LDB IB | TEST FOR SDC |
| 2207 | 44422 | 035516 | | STB DEQUE | |
| 2208 | 44423 | 176431 | | SBM HALAS | YES |
| 2209 | 44424 | 001510 | | LDA WDPCT | PEN: |
| 2210 | 44425 | 073427 | | RLA HALAS | UP - HAUL IT! |
| 2211 | 44426 | 001554 | | LDA CURPN | SET |
| 2212 | 44427 | 020325 | | ADA PSTAD | CURRENT |
| 2213 | 44430 | 130000 | | LDA A,I | PEN |
| 2214 | 44431 | 031547 | | STA SPEED | CLAMP |
| 2215 | 44432 | 001560 | | LDA MAJSW | MOVE |
| 2216 | 44433 | 072417 | | SZA CLAMP | NO - USE SPEED LIMIT |
| 2217 | 44434 | 005561 | | LDB SWAIT | TOO SLOW? |
| 2218 | 44435 | 076002 | | RZB *+2 | YES - |
| 2219 | 44436 | 004204 | | LDB N1 | SLOW DOWN |
| 2220 | 44437 | 025417 | | ADB LASTS | ELSE |
| 2221 | 44440 | 014171 | | CPB SLOWL | SPEED UP |
| 2222 | 44441 | 067445 | | JMP *+4 | CHECK |
| 2223 | 44442 | 014203 | | CPB FASTL | SPEED |
| 2224 | 44443 | 067445 | | JMP *+2 | LIMITS |
| 2225 | 44444 | 035417 | | STB LASTS | KEEP FOR NEXT TIME |
| 2226 | 44445 | 101417 | | LDA LASTS,I | GET AUTO PACE SPEED |
| 2227 | 44446 | 030001 | | STA B | CLIP |
| 2228 | 44447 | 174440 | | TCB | SPEED LIMIT |
| 2229 | 44450 | 025547 | | ADB SPEED | AUTO PACE SPEED |
| 2230 | 44451 | 176004 | | SBP *+4 | TOO FAST? |
| 2231 | 44452 | 031547 | CLAMP | LDA SPEED | YES - USE SPEED LIM |
| 2232 | 44453 | 067455 | | JMP *+2 | NO - AUTO PACE |
| 2233 | 44454 | 000202 | HALAS | LDA O132 | TOP SPEED IF PEN UP |
| 2234 | 44455 | 031057 | | STA LIMIT | SET SPEED FOR THIS MOVE |
| 2235* | | | | | |
| 2236 | 44456 | 005510 | DOPEN | LDB WDPCT | DESIRED PEN |
| 2237 | 44457 | 031516 | | LDA DEQUE | SEL DEV CLEAR? |
| 2238 | 44460 | 172002 | | SAP *+2 | SKIP IF NOT |
| 2239 | 44461 | 004172 | | LDB 01 | ELSE FORCE PEN UP |
| 2240 | 44462 | 001602 | | LDA OTWD | GET PEN CURRENT |
| 2241 | 44463 | 076006 | | RZB UPPEN | SKIP IF PEN TO BE UP |
| 2242 | 44464 | 040663 | | JSM IXOR | CHANGE PEN? |
| 2243 | 44465 | 005025 | | LDB UP2ON | LONG DELAY |
| 2244 | 44466 | 073007 | | SLA STDLA | SKIP IF YES |
| 2245 | 44467 | 005027 | | LDB DN2ON | NO - USE SHORT DELAY |
| 2246 | 44470 | 067475 | | JMP STDLA | |
| 2247* | | | | | |
| 2248 | 44471 | 040663 | UPPEN | JSM IXOR | CHANGE PEN? |

| Sequence No. | ROM Address (Octal) | Object Code (Octal) | Label | Program Instruc'n. | Remarks |
|---|---|---|---|---|---|
| 2249 | 44472 | 005026 | | LDB ON2UP | LONG DELAY |
| 2250 | 44473 | 073002 | | SLA *+2 | SKIP IF YES |
| 2251 | 44474 | 004226 | | LDB 00 | NO DELAY |
| 2252 | 44475 | 035524 | STDLA | STB DELAY | SET DELAY |
| 2253* | | | | | |
| 2254 | 44476 | 073405 | | RLA THRU | NEED TO OUTPUT PEN TO FP? |
| 2255 | 44477 | 005510 | | LDB WDPCT | YES - |
| 2256 | 44500 | 077402 | | RLB *+2 | ASSEMBLE |
| 2257 | 44501 | 020172 | | ADA 01 | NEW FP |
| 2258 | 44502 | 040502 | | JSM FP&OT | |
| 2259* | | | | | |
| 2260 | 44503 | 000226 | THRU | LDA 00 | INITIALIZE |
| 2261 | 44504 | 031561 | | STA SWAIT | WAIT FLAG |
| 2262 | 44505 | 020172 | | ADA 01 | BUSY |
| 2263 | 44506 | 031543 | | STA SSTAT | SERVO |
| 2264 | 44507 | 001516 | | LDA DEQUE | SEL DEV CLEAR? |
| 2265 | 44510 | 004226 | | LDB 00 | |
| 2266 | 44511 | 035516 | | STB DEQUE | |
| 2267 | 44512 | 172402 | | SAM *+2 | SKIP IF YES |
| 2268 | 44513 | 170201 | | RET 1 | ELSE RETURN TO CALLER OF MOVE |
| 2269* | | | | | |
| 2270 | 44514 | 040516 | | JSM WT4SV | |
| 2271 | 44515 | 064373 | | JMP IDLE | FORCE ENTRY TO PARSER |
| 5862** | | | | TABLE OF AUTO PACE SPEEDS | |
| 5864 | 00171 | 000171 | SLOWL | DEF * | |
| 5865 | 00172 | 000001 | 01 | DEC 1 | |
| 5866 | 00173 | 000002 | 02 | DEC 2 | |
| 5867 | 00174 | 000003 | 03 | DEC 3 | |
| 5868 | 00175 | 000005 | 05 | DEC 5 | |
| 5869 | 00176 | 000012 | 012 | DEC 10 | |
| 5870 | 00177 | 000021 | 021 | DEC 17 | |
| 5871 | 00200 | 000035 | | DEC 29 | |
| 5872 | 00201 | 000063 | | DEC 51 | |
| 5873 | 00202 | 000132 | 0132 | DEC 90 | |
| 5874 | 00203 | 000203 | FASTL | DEF * | |
| 5877** | | | | CONSTANTS: N -OCT , O +OCT , M -DEC , P +DEC | |

Figure 5:
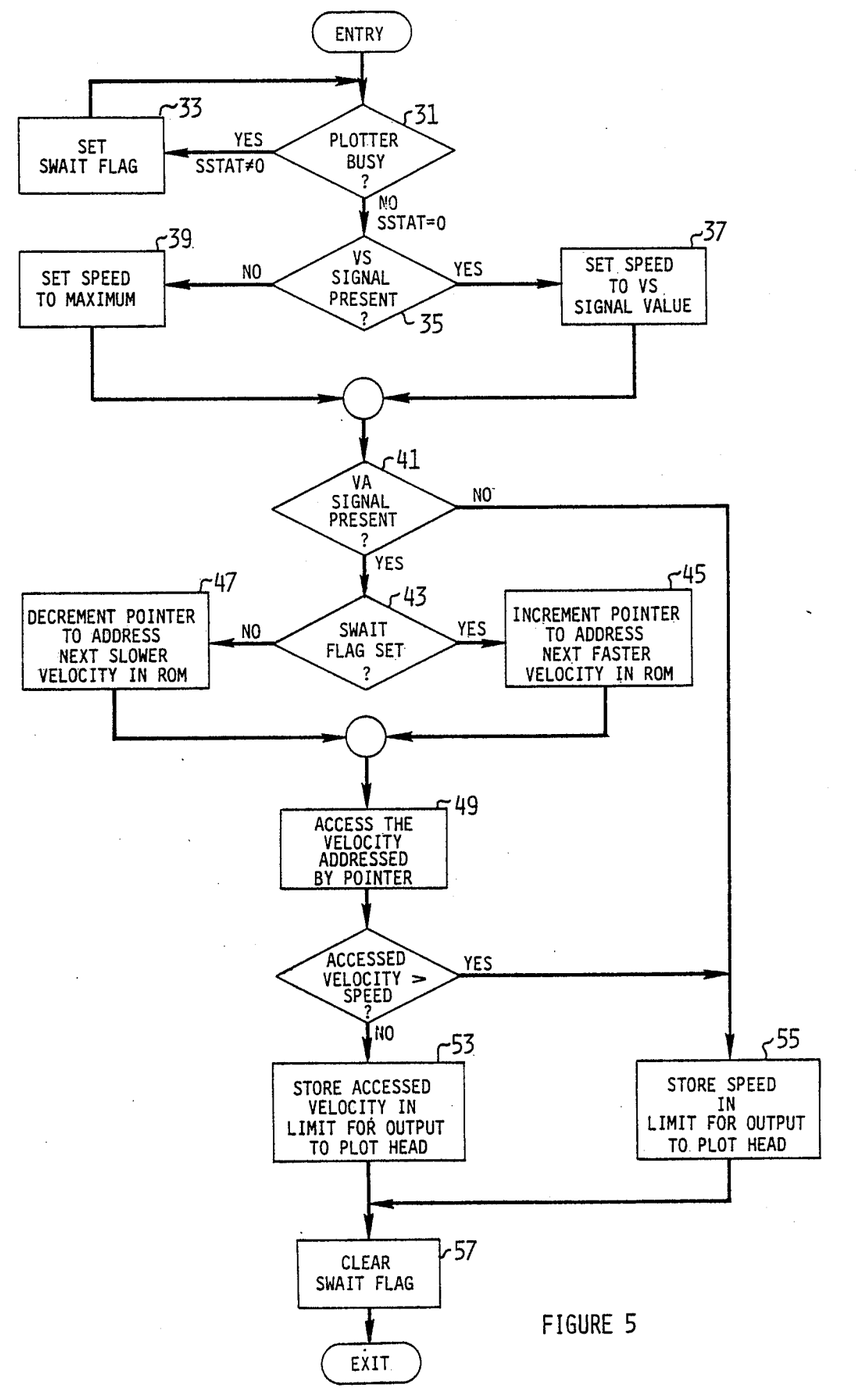
FIG. 5 is a logic flow diagram of a routine stored in one of the memory units of FIG. 3.

The above routine is entered and executed whenever there is data to be plotted, i.e., whenever data is entered into RAM 17. During execution of the routine, the operation represented by block 31 is first performed. At block 31, a test is made to determine whether the plotter is busy plotting a previous data value. This determination is achieved by testing the contents of RAM word SSTAT. If the contents of SSTAT is found to be non-zero, an SWAIT flag is set (i.e., word SWAIT of RAM 17 is set to one) as shown by block 33, and control is returned to block 31. However, if the contents of SSTAT is found to be zero indicating that the plotter is not busy but ready to plot another data value, control is transferred to block 35. At block 35, a test is made to determine if a limiting or maximum velocity has been specified for plot head 15 by means of an applied VS signal as indicated in FIG. 1. If no maximum velocity has been specified (i.e., no VS signal applied to processor 19), the velocity value of ninety is selected as the maximum head velocity from the table of control words in ROM 21. This value of ninety is then stored, for later use, in control word "SPEED" of RAM 17 as shown by block 39, after which control is transferred to block 41. (As shown in FIG. 3, a head velocity value selected from ROM 21 may range from a minimum value of one to a maximum value of 90.) If a maximum velocity has been specified for plot head 15 by means of an applied VS signal, control is transferred from block 35 to block 37. At block 37, the specified maximum velocity is stored for later use in the SPEED control word of RAM 17, after which control is transferred to block 41. At block 41, a test is made to determine if the automatic or adaptive velocity mode of operation has been specified. (A user may specify adaptive velocity mode by entering or applying a VA signal to the system as indicated in FIG. 1.) If adaptive velocity mode has not been specified, i.e., no VA signal has been applied to processor 21, control is transferred to block 55. If a VA signal has been applied to processor 21 indicating that adaptive velocity operations are to be performed, control is transferred to block 43 where a test is made to determine the status (set or not set) of the SWAIT flag.

If the SWAIT flag is set (i.e., the contents of the SWAIT word in RAM 17 is nonzero), control is transferred to block 45. An SWAIT flag that is set indicates that a new data value to be plotted has been received by RAM 17 while plot head 15 was still busy plotting a current data value, the current data value being the data value that is received immediately before the new data value. At block 45, the contents of control word POINTER in RAM 17 is incremented so as to point to the next faster speed (head velocity) in ROM 21. For example, if before the operation at block 45 was performed, the word POINTER was pointing to head velocity 29 in ROM 21, the performance of the operation represented by block 45 would cause the contents of the word POINTER to be incremented by one so as to now point to or address the head velocity value of 51 in ROM 21. After performance of the operation at block 45, control is transferred to block 49.

If the SWAIT flag at block 43 is found to be not set (i.e., the contents of the SWAIT word in RAM 17 is found to be nonzero), control is transferred to block 47. At block 47, the contents of control word POINTER in RAM 17 is decremented so as to point to the next slower head velocity in ROM 21. For example, if before the operation at block 47 was performed, the word POINTER was pointing to head velocity 29 in ROM 21, the performance of the operation represented by block 47 would cause the contents of the word POINTER to be decremented by one so as to now point to the head velocity value of 17 in ROM 21. After performance of the operation at block 47, control is transferred to block 49.

Thus, from the operations performed at blocks 45 and 47, the POINTER control word is made to point to a slower or faster head velocity depending on whether plotting is occurring faster or slower, respectively, than the input data rate. In other words, if a new input data value is received while plot head 15 is busy (i.e., before plot head 15 has completed its move in plotting a current input data value that was received immediately before the new input data value), the plotting operation is interpreted as lagging the input data rate and the POINTER control word is incremented to point to the next faster head velocity. If plot head 15 completes its previous move and becomes not busy before a next or new data value is received, the plotting operation is interpreted as exceeding the input data rate and the POINTER control word is decremented to point to the next slower head velocity.

Receipt of a new input data value before or after completion of plotting of a current input data value by plot head 15 may be caused by either or both of two factors, namely, a change in the input data rate, and a change in the distance or difference between two successive input data values. Thus, a previously selected velocity for the plot head 15 would be increased to compensate for (adapt to) either (1) an increase in input data rate that causes a new data value to be received before completion of plotting of a previous (current) input data value, or (2) an increase in distance between input data values that, likewise, causes a new input data value to be received before the distance is completely traversed by plot head 15. From the foregoing, therefore, it can be seen that by selecting or pointing to different head velocities in ROM 21 in accordance with a new input data value received before or after completion of plotting of a current input data value by plot head 15, the velocity of plot head 15 is made adaptive to changes in either or both of the input data rate and the difference between successive input data values.

Returning now to FIG. 5, block 49 represents an accessing operation. At block 49, a head velocity value is accessed from the nine head velocity values stored in ROM 21. This accessing or selection operation is performed using the contents of the POINTER control word as a pointer or address. Following the operation at block 49, the operation at block 51 is performed. At block 51, a test is made to determine if the accessed velocity value from ROM 21 is greater than the maximum velocity value stored in the SPEED control word of RAM 17. If the accessed velocity value is not greater than this maximum velocity value, control is transferred to block 53. At block 53, the accessed velocity value is stored in RAM word "LIMIT" for use as the controlling velocity at which the plot head 15 is to be moved during its traverse to the next data position represented by a newly received data value. If, at block 51, the velocity value accessed from ROM 21 is found to be greater than the maximum velocity value stored in control word SPEED, the operation at block 55 is performed next. AT block 55, the maximum velocity value is stored in RAM word "LIMIT" for use as the controlling velocity of plot head 15 during its next move. The controlling velocity value stored in RAM word "LIMIT" is then applied, via motor unit 13, to plot head 15 as a series of digital pulses representing a velocity signal, as shown in FIG. 1. The velocity signal is applied to plot head 15 each millisecond period of the 1 KHz clock signal applied to processor 19 shown in FIG. 1. This controlling velocity value stored in "LIMIT," therefore, represents a selected distance that plot head 15 is to be moved each millisecond of the clock signal.

Following the operation at block 53 or block 55, control is transferred to block 57. At block 57, the SWAIT flag is cleared (i.e., the SWAIT word is reset to zero) and exit is made from the routine in preparation for selection of a next velocity value from ROM 21 and the output of other velocity pulses to plot head 15 in response to receipt of a subsequent data value. After the operation at block 57 is performed, exit is made from the routine.

A motor unit 13 suitable for moving plot head 15 in response to velocity signals is shown and described in patent application entitled "OPEN-LOOP ELECTRIC DRIVE WITH CORRECTIVE CONTROLLER," Ser. No. 756,679, filed Jan. 4, 1977 by Marvin LeRoy Patterson, Robert Dale Haselby and Albert Prall Kendig.

When the individual input data values that are applied to the system occur in X–Y coordinate pairs, for example, a current pair $(X_0, Y_0)$ followed by a new or subsequent pair $(X_1, Y_1)$, the coordinate along which the distance (difference in magnitude) between the data values is greater is utilized in determining the head velocity value that is selected. Thus, for a coordinate pair (2,5) followed by coordinate pair (3,7), the difference between the Y coordinate values would be used in determining the head velocity, because the difference ($\Delta Y$) between the Y coordinate values (5 and 7) is greater than the difference ($\Delta X$) between the X coordinate values (2 and 3).

If, as described above, $\Delta Y$ is found to be greater than $\Delta X$, the head velocity in the X-axis direction may be calculated from the head velocity selected in the Y-axis direction, as follows:

$$d_x = (1/m)\, d_y;\ m = \Delta Y/\Delta X$$

where, $d_x$ represents the head velocity (incremental move per millisecond) in the X-axis direction, $d_y$ represents the head velocity (incremental move per millisecond) in the Y-axis direction, and $m$ represents the slope of the vector connecting points ($X_0$, $Y_0$) and ($X_1$, $Y_1$). Similarly, if the X component ($\Delta X$) of a vector to be traversed by plot head 15 is found to longer than $\Delta Y$, $d_y$ may be calculated from $d_x$ as follows:

$$d_y = md_x$$

The head velocity values $d_x$ and $d_y$ may then be applied to the motor unit shown, for example, in FIG. 6 of the system of Patterson, et al., mentioned above, to provide smooth substantially continuous movement of the plot head in response to applied input data point values, thereby improving plotted line quality by reducing the time that the plot head remains stationary waiting for data.

I claim:

1. Apparatus for producing substantially smooth and continuous motion of a member across a surface in response to successive data values applied at a selected data rate, said apparatus comprising:
    a member mounted for movement relative to the surface;
    motor means coupled to the member and responsive to an applied velocity signal for moving the member at a selected velocity; and
    adaptive velocity means for causing the member to move at the selected velocity, substantially reducing the length of time that the member remains stationary waiting for input data, said adaptive velocity means including:
       means for storing successive data values applied at an input rate,
       means coupled to the storage means for applying to the motor means the velocity signal representing the selected velocity at which the member is to be moved, said selected velocity being variable with changes in at least one of the input data rate and the difference between successive data values.

2. The apparatus of claim 1 wherein the means for storing data is a random access memory unit.

3. The apparatus of claim 2 wherein the means for producing a velocity signal includes a processor unit and a read only memory unit having a stored routine, the processor unit operating under control of the routine and in accordance with data stored in the random access memory unit to produce the velocity signal.

4. The apparatus of claim 3 wherein said apparatus is a coordinate display system and said member is a display producing unit.

5. The apparatus as in claim 4 wherein the coordinate display system is a plotter system and the display producing unit is a plot head having a pen mounted thereon.

6. The apparatus of claim 5 wherein the plotter system is an X-Y plotter system in which the velocity of the plot head, in a coordinate direction, is determined by the processor unit from the greater of the difference between a first data value and a second consecutive data value in a first coordinate direction and the difference between said first and second consecutive data values in a second coordinate direction.

7. A method of producing substantially smooth and continuous motion of a member across a surface in response to successive data values applied at a selected data rate, the method comprising the steps of:
    receiving and storing data values representing positions to which the member is to be moved;
    selecting a first velocity at which the member is to be moved in response to the data rate exceeding a previous rate of motion of the member and a second velocity at which the member is to be moved in response to the data rate being less than a previous rate of motion of the member; and
    applying a signal representing the selected velocity to a motor means for moving the member at the selected velocity.

8. The method of claim 7 where the step of selecting a velocity includes the step of accessing a series of predetermined velocity values, each velocity value in the series representing a selected distance that the member is to be moved within a predetermined unit of time.

9. The method of claim 8 where the step of accessing a series of predetermined velocity values includes the step of addressing a selected velocity value in the series, the first velocity value being addressed in response to receipt of a subsequent data value occurring before completion of movement of the member to a previous position, and the second velocity value being addressed in response to receipt of a subsequent data value occurring after completion of movement of the member to a previous position, said previous position being represented by a data value received immediately before the subsequent data value.

10. The method of claim 8 where the predetermined velocity values are exponential values.

* * * * *